United States Patent
Zhang (10) Patent No.: US 10,699,153 B2
(45) Date of Patent: Jun. 30, 2020

(54) PROVIDING DIVERSE AND REPRESENTATIVE SWATCHES EXTRACTED FROM AN INPUT IMAGE

(71) Applicant: Adobe Inc., San Jose, CA (US)

(72) Inventor: Jianming Zhang, Campbell, CA (US)

(73) Assignee: Adobe Inc., San Jose, CA (US)

( * ) Notice: Subject to any disclaimer, the term of this patent is extended or adjusted under 35 U.S.C. 154(b) by 115 days.

(21) Appl. No.: 15/935,892

(22) Filed: Mar. 26, 2018

(65) Prior Publication Data
US 2019/0294916 A1    Sep. 26, 2019

(51) Int. Cl.
*G06K 9/46* (2006.01)
*G06N 3/08* (2006.01)

(52) U.S. Cl.
CPC ............ *G06K 9/4671* (2013.01); *G06N 3/08* (2013.01); *G06K 9/4652* (2013.01)

(58) Field of Classification Search
CPC ....... G06K 9/4671; G06K 9/4652; G06N 3/08
See application file for complete search history.

(56) References Cited

U.S. PATENT DOCUMENTS 9,626,584 B2    4/2017  Lin et al.
9,798,949 B1 *  10/2017 Du ........................... G06K 9/46
10,282,431 B1 *  5/2019  Bhotika .............. G06F 16/5838

* cited by examiner

Primary Examiner — Leon Flores
(74) Attorney, Agent, or Firm — Kilpatrick Townsend & Stockton LLP (57) ABSTRACT

Certain embodiments involve determining a diverse and representative subset of swatches of an input image. For example, a graphic manipulation application determine a salient object in an image. The graphic manipulation application extracts multiple swatches from the image. In some cases, the swatches include pixels included in the salient object. The graphic manipulation application computes selection scores for the multiple swatches by combining, for each swatch, a likelihood score indicating a representativeness of a pattern depicted by a respective swatch, and a dominance score indicating a dominance of the pattern depicted by the respective swatch. The graphic manipulation application generates, based on the selection scores of the multiple swatches, a subset of the multiple swatches extracted from the image.

20 Claims, 7 Drawing Sheets

PROVIDING DIVERSE AND REPRESENTATIVE SWATCHES EXTRACTED FROM AN INPUT IMAGE

TECHNICAL FIELD

This disclosure relates generally to the field of image processing, and more specifically relates to extracting a set of representative image swatches from the image content, and providing the set of image swatches for creation of diverse and representative graphical content.

BACKGROUND

Online image repositories have extensive quantities of image content depicting a wide variety of objects in the images. Many of those depicted objects have appearance options based on multiple colors or patterns. Therefore, creation of "swatch" images that represent a particular color, pattern, or other appearance exemplar is necessary. But existing techniques for swatch creation are manual, expensive, and reliant on an individual to visually analyze the content of an image and select a representative region for the swatch creation.

For example, an image depicts an object that comes in a variety of colors or patterns. The depicted object may have different areas that display portions of the colors or pattern, such as a shirt that has a torso in one color and sleeves in a different color. Current techniques to select swatches representative of the different colors or patterns are manually intensive and may require a relatively long amount of time to select accurate swatches for a large set of images. For example, manual selection of swatches may require a person, such as a graphic designer, to spend several minutes reviewing an image, determining one or more representative areas of an object depicted in the image, and providing inputs to a user interface to indicate the swatches he or she is selecting as the representative areas. For a large group of images (e.g., hundreds or thousands of images), the amount of time, computing resources, or financial resources required to manually select the representative swatches may be prohibitively high.

In addition, manual techniques for selecting swatches reach inconsistent results when determining what constitutes a swatch that most accurately represents an appearance of a depicted object. For example, when selecting swatches for a large group of images, different people reviewing various images in the group may select swatches based on their personal interpretations of the images. Differences between the people reviewing the images may result in inconsistent swatches that represent the images poorly. Also, variations in size and content of a manually selected swatch can reduce the representativeness of the swatch. For example, selected swatches that represent a particular area of the image (e.g., a logo, or a small portion of a varied pattern) may not represent multiple diverse aspects of the depicted object compared to other areas of the image (e.g., a background), depending on the size and overall content of the image.

Therefore, existing solutions may involve disadvantages for the reasons such as (but not limited to) those described above.

BRIEF DESCRIPTION OF THE DRAWINGS

Features, embodiments, and advantages of the present disclosure are better understood when the following Detailed Description is read with reference to the accompanying drawings, where.

SUMMARY

Certain embodiments involve determining a diverse and representative subset of swatches of an input image. For example, a graphic manipulation application determines a salient object in an image. The graphic manipulation application extracts multiple swatches from the image. In some cases, the graphic manipulation application computes selection scores for the multiple swatches by combining a computed likelihood score and a dominance score. Additionally or alternatively, the graphic manipulation application generates, based on the selection scores of the multiple swatches, a subset of the multiple swatches extracted from the image.

These illustrative embodiments are mentioned not to limit or define the disclosure, but to provide examples to aid understanding thereof. Additional embodiments are discussed in the Detailed Description, and further description is provided there.

DETAILED DESCRIPTION

Certain embodiments of the present disclosure include systems and methods for determining a diverse subset of likely representative swatches. As explained above, conventional techniques for determining a diverse subset of representative swatches are time-consuming, and often inaccurately represent the image appearance content. By contrast, certain techniques described herein can provide a set of diverse swatches that accurately represent content of an image.

For example, a swatch determination engine determines an object depicted in an image, such as by using techniques for detecting salient objects. The swatch determination engine extracts multiple swatches that include pixels depicting a portion of the object. Additionally or alternatively, a likelihood scoring engine determines, for each of the swatches, one or more of a likelihood score or a dominance value. Each likelihood score indicates, for example, a likelihood that the associated swatch accurately represents the image content. Each dominance value indicates, for example, whether the associated swatch depicts a pattern (including a color) that is prevalent in the other swatches. The multiple swatches are compared based on the likelihood scores and the dominance values, such as in an iterative pairwise comparison. Based on the comparison, a representative and diverse subset of the extracted swatches is determined.

Contrasted with existing efforts for manually selecting representative swatches, the described embodiments include techniques for automated extraction and comparison of swatches, providing an improvement in the speed by which representative swatches are determined for images, including large groups of images. The described embodiments also include automated generation of numeric metrics describing the representativeness (e.g., likelihood score) and prevalence (e.g., dominance value) of the patterns depicted by each swatch, providing a consistent and mathematically-based technique to determine representative swatches, instead of relying on subjective judgements, such as by human reviewers.

Figure 1:
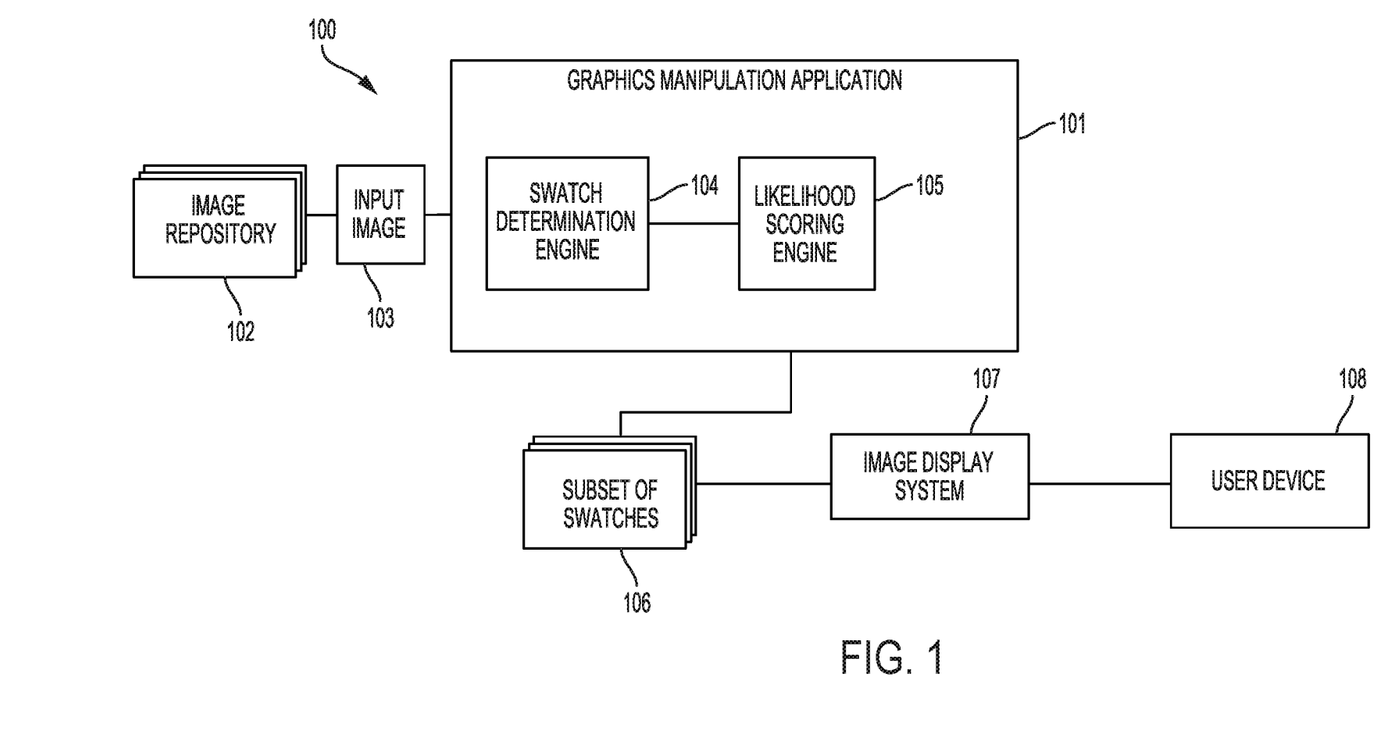
FIG. 1 is a block diagram depicting an example of a computing environment for determining a diverse subset of likely representative swatches, according to certain embodiments of the present disclosure.

Referring now to the drawings, FIG. 1 is a block diagram depicting an example of a computing environment 100 in which one or more representative and diverse swatches, such as a subset of swatches 106, are determined for an image, such as an input image 103. In the computing environment 100, a graphics manipulation application 101 includes one or more of a swatch determination engine 104 or a likelihood scoring engine 105. In FIG. 1, the swatch determination engine 104 extracts one or more swatches from an image. Additionally or alternatively, the likelihood scoring engine 105 compares the swatches to produce the subset of swatches 106.

In some cases, an extracted swatch includes a portion of the input image 103. For example, a swatch includes pixels depicting a portion of a salient object depicted by the input image 103. Additionally or alternatively, the swatch includes pixels depicting an appearance of the salient object. For convenience and not by way of limitation, the appearance depicted by the pixels is referred to herein as a pattern. In addition, for convenience and not by way of limitation, the pattern could include a solid color, multiple colors (including a gradient between colors), a repeating appearance, an irregular appearance, a symmetric appearance, an asymmetric appearance, any other suitable appearance, or any combination of these.

In FIG. 1, image repository 102 provides the input image 103 to graphics manipulation application 101. In some embodiments, the graphics manipulation application 101 applies swatch determination engine 104 to extract multiple swatches from the input image 103. Additionally or alternatively, the swatch determination engine 104 determines at least one salient object depicted in input image 103. For example, the swatch determination engine 104 determines a salient object, such as an object depicted in a foreground of the image, based on one or more salient object detection techniques. In some cases, the swatch determination engine 104 may extract swatches from input image 103 such that the swatches contain pixels included in the salient object.

In some embodiments, the likelihood scoring engine 105 performs an analysis of each individual swatch. Based on the swatch analysis, the likelihood scoring engine 105 determines a respective likelihood score for each swatch, such as based on one or more of an output from a neural network or a similarity score associated with the swatch. The graphics manipulation application 101 compares the multiple swatches, such as by a comparison of each extracted swatch to each other extracted swatch. In some embodiments, a dominance value for each swatch is determined based on the comparison, as described elsewhere herein. Based on the comparison, the graphics manipulation application 101 generates the subset of swatches 106. For example, the graphics manipulation application 101 selects at least one extracted swatch based on the respective likelihood score and dominance value, and generates the subset of swatches 106 based on the selected swatch. In some cases, the swatches in the subset of swatches 106 depict diverse and representative patterns from the content of input image 103.

In the computing environment 100, the subset of swatches 106 is provided to the image display system 107. In some embodiments, image display system 107 is an electronic service capable of providing image content in response to user device 108 requests. For example, image display system 107 may be a third-party content provider service. In additional or alternative embodiments, image display system 107 is a local content server in computing environment 100. However, other configurations may be implemented using additional or alternative components. In some cases, the user device 108 displays, such as on a monitor or other display device, image content based on the subset of swatches 106. For example, the user device 108 may display a combination of the input image 103 and the subset of swatches 106, such as to indicate to the user a product selection or color palette associated with objects depicted in the input image 103.

Figure 2:
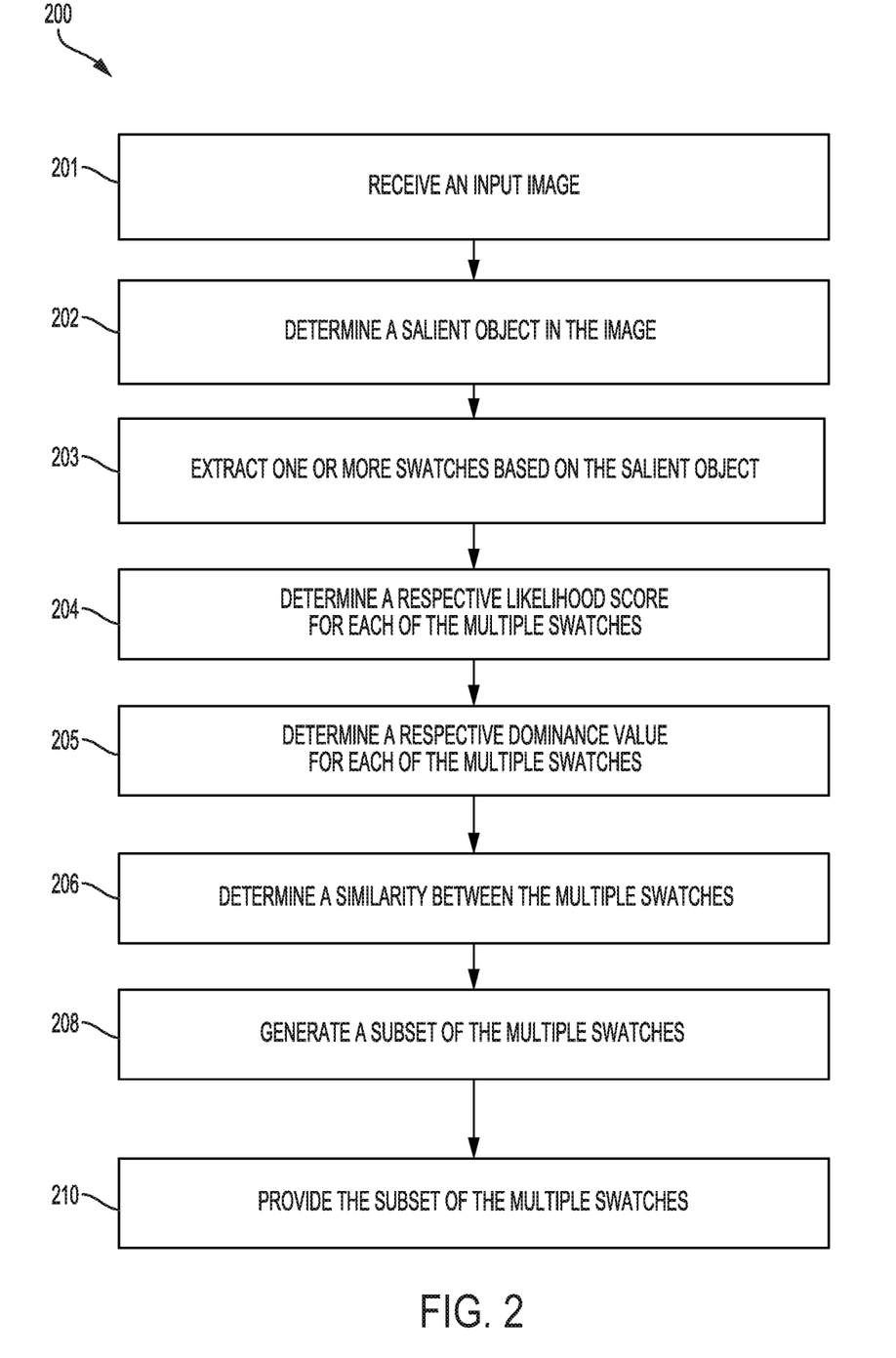
FIG. 2 is a flowchart depicting an example of a process for determining a diverse subset of likely representative swatches, according to certain embodiments of the present disclosure.

FIG. 2 depicts an example of a process 200 for generating a diverse and representative subset of swatches extracted from an image, such as the subset of swatches 106 based on the input image 103, according to certain embodiments of the present disclosure. One or more computing devices (e.g., devices included in the computing environment 100) implement operations depicted in FIG. 2 by executing suitable program code. For illustrative purposes, the process 200 is described with reference to certain examples depicted in the figures. Other implementations, however, are possible.

At block 201, the process 200 involves receiving an input image. The image is received by a graphics manipulation application, for example, from an image repository or other repository suitable for storing graphical content. Other implementation are, however, possible. For instance, graphics manipulation application 101 may receive input image 103 via a network, or via another technique for transferring images.

At block 202, the process 200 involves determining a salient object in the image. For example, the input image is analyzed based on one or more salient object detection techniques. In some embodiments, the swatch determination engine 104 determines a salient object depicted by input image 103 based on a technique including salient object segmentation. In some embodiments, the salient object segmentation method will generate a binary mask to localize the foreground region. Additionally or alternatively, the binary mask includes pixels, each mask pixel having one of two values (e.g., black or white, zero or 255), such that the value of each mask pixel indicates whether a corresponding pixel in the input image 103 is included in the salient object. For example, a mask pixel having a value for white indicates that a corresponding image pixel is included in the salient object. An additional mask pixel having a value for black indicates that an additional corresponding image pixel is not included in the salient object (e.g., included in a background). Additionally or alternatively, the salient object segmentation determines one or more saliency maps and computes scores indicative of quality, amount of salient content preserved from the original image, and boundary simplicity. Other implementations of salient object determination are possible, such as (but not limited to) the techniques described in U.S. Pat. No. 9,626,584, incorporated herein by reference in its entirety. In additional or alternative embodiments, more than one salient object is determined in the input image.

At block 203, the process 200 involves extracting one or more swatches from the input image. In some cases, the swatches are extracted based on the salient object. For example, the swatch determination engine 104 extracts multiple swatches from input image 103, where each extracted swatch includes one or more pixels from the salient object of input image 103. Additionally or alternatively, the extracted swatches include pixels depicting an appearance of the salient object, such as a pattern of the object. In some cases, at least two of the extracted swatches overlap, such as at least two swatches that include a particular pixel depicting a particular area of the salient object.

At block 204, the process 200 involves determining a likelihood score for each of the multiple swatches. The likelihood scoring engine 105 determines a respective likelihood score for each swatch extracted by swatch determination engine 104. For instance, the likelihood scoring engine 105 determines the likelihood that a particular swatch is a representative swatch. In some cases, a representative swatch is determined based on a score function, as described elsewhere herein. Additionally or alternatively, a representative swatch is determined based on a trained neural network, as described elsewhere herein. For the purpose of broad understanding, and not by way of limitation, a representative swatch generally refers to a swatch that includes pixels representing the surrounding appearance of the salient object.

At block 205, the process 200 involves determining a dominance value for each of the multiple swatches. For instance, the likelihood scoring engine 105 determines that a pattern depicted by a particular swatch is a dominant pattern, such as a pattern that is included in multiple other extracted swatches. Additionally or alternatively, the likelihood scoring engine 105 determines a respective dominance value for the particular swatch based on a comparison between the particular swatch and one or more additional swatches. In some cases, the dominance value of the particular swatch is determined based on the likelihood score of the particular swatch. For the purpose of broad understanding, and not by way of limitation, a particular swatch with a high dominance value generally has a low diversity compared to the other swatches depicting the dominant pattern.

At block 206, the process 200 involves determining a selection score for each of the multiple swatches. In some cases, the selection score is determined based on one or more of the likelihood score determined with regards to block 204 or the dominance value determines with regards to block 205. In some embodiments, the selection score for a particular swatch is determined based on a combination of the respective likelihood score and dominance value for the swatch. Additionally or alternatively, one or more of the likelihood score or dominance value may be weighted, such as by a weighting parameter. For the purpose of broad understanding, and not by way of limitation, a combination of the likelihood score and dominance value for a particular swatch generally indicates a representativeness and a diversity of the particular swatch. For the purpose of broad understanding, and not by way of limitation, a higher likelihood score generally indicates a higher representativeness and a lower dominance value generally indicates a higher diversity.

At block 208, the process 200 involves generating a subset of the multiple swatches. For instance, the subset of swatches 106 includes swatches with respective selection scores having a relation to a threshold value, such as a selection score that is above (or equal to, or below) the threshold value. Additionally or alternatively, the subset of swatches 106 includes a quantity of swatches with respective selection scores having a relation to other selections scores of other swatches, such as a swatch with a selection score that is greater than (or less than) a quantity (e.g., 95%) of other selection scores of other swatches.

At block 210, the process 200 involves providing the subset of the multiple swatches, such as to a display or a storage device associated with a computing system. In some cases, the subset of swatches is associated with the input image. The associated image and swatch subset are stored, for example, in a shared format in a data repository (e.g., as part of a record in a database). In some embodiments, the graphics manipulation application 101 provides the subset of swatches 106 to image display system 107. Additionally or alternatively, the image display system 107 sends the input image 103 and the subset of swatches 106 to a user device 108 in response to a request by user device 108.

In some embodiments, a likelihood score of a particular swatch is based on one or more of a similarity between regions of an input image or an output from a neural network. For example, the likelihood scoring engine 105 may determine a likelihood score for a particular swatch based on an inner similarity score and an outer similarity score of an image region surrounding the particular swatch. Additionally or alternatively, the likelihood scoring engine 105 may determine the likelihood score for the particular swatch based on an output received from a deep learning neural network.

Likelihood Score Based on Similarity of Image Regions

In some cases, a likelihood score for a swatch is based on an inner similarity score and an outer similarity score of an image region. The image region may surround the swatch, such that the swatch includes pixels that are included in the region, and the image region includes additional pixels that are not included in the swatch. Additionally or alternatively, the swatch within the region may be centered, off-center, or have one or two edges common with the region (e.g., along a border or in a corner of the region).

Figure 3:
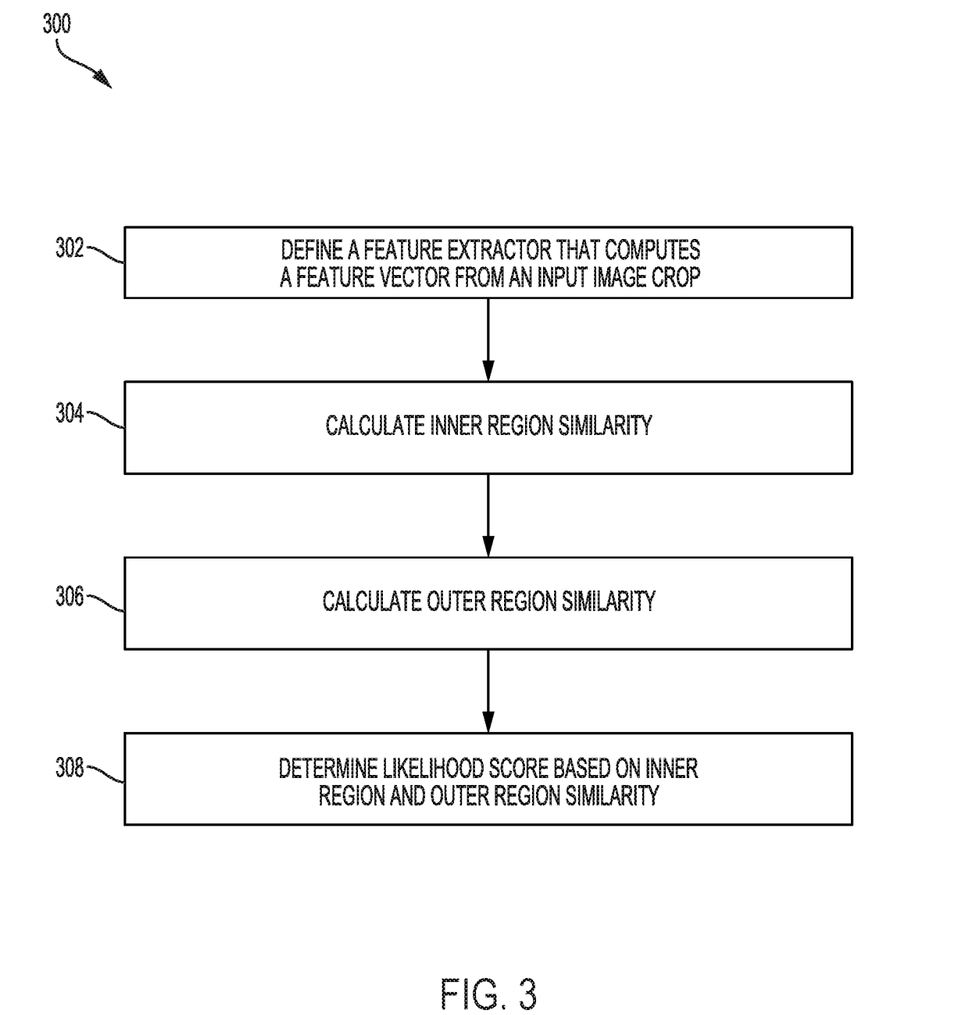
FIG. 3 is a flowchart depicting an example of a process for determining a likelihood score based on a region similarity approach, according to certain embodiments of the present disclosure.

FIG. 3 depicts an example of a process 300 for determining a likelihood score based on a similarity between regions on an image. One or more computing devices (e.g., devices included in the computing environment 100) implement operations depicted in FIG. 3 by executing suitable program code. For illustrative purposes, the process 300 is described with reference to certain examples depicted in the figures. Other implementations, however, are possible. For instance, the likelihood scoring engine 105 determines a feature extractor, computes at least one similarity metric, and determines a likelihood score based at least in part on the similarity metric.

At block 302, the process 300 involves defining a feature extractor f(•), such as to compute a vector out of image swatches. A feature extractor may be a function, module, or other executable program code which identifies a unique or distinctive element in an image. In some embodiments, the feature extractor may store features in a vector $f_i$. In additional or alternative embodiments, the feature extractor may store features in more than one vector, or another feature storage data structure can be used. For instance, the likelihood scoring engine 105 determines a feature extractor. In some cases, a similarity function sim(f(a),f(b)) is defined based on regions a and b of an image, e.g., the input image 103. In some cases, the regions a and b each include a group of contiguous pixels from the image, such as a group of pixels included in the salient object of the image.

At block 304, the process 300 involves calculating an inner region similarity. For instance, the likelihood scoring engine 105 calculates the inner region similarity. In some embodiments, to compute the similarity functions, the main swatch is defined as a region R. Additionally or alternatively, the region R is divided into an n×n grid and define multiple sub-regions $r_i$ and $r_j$ within region R. The inner similarity can be formulated, for example, by the Equation 1.

$$S_{inner}^f(R) = \min_{i,j} sim(f(r_i), f(r_j)) \qquad \text{Eq. 1}$$

In Equation 1, $r_i$ and $r_j$ are sub-regions of the swatch region R. In some cases, the sub-regions only include pixels that are also included in the swatch. The term $S_{inner}^f$ indicates an inner similarity score of a feature vector for the region R based on the minimum similarity between the each of the sub-regions $r_i$ and $r_j$. Additionally or alternatively, the feature extractor f(•) determines features of the indicated region or sub-region. For example, $f(r_i)$ determines features of the sub-region $r_i$. In some cases, the inner region similarity identifies a particular swatch within the region R that has a homogenous color or pattern within the particular swatch.

At block 306, the process 300 involves calculating an outer region similarity. For instance, the likelihood scoring engine 105 calculates the outer region similarity. The outer region similarity can be formulated, for example, by the Equation 2.

$$S_{outer}^f(R) = \min_n sim(f(R), f(R_n)) \qquad \text{Eq. 2}$$

In the Equation 2, R indicates the swatch region R, and $R_n$ denotes the nth region neighboring the region R. In some cases, the region $R_n$ is overlapping with region R. The term $S_{outer}^f$ indicates an outer similarity score of a feature vector for the region R based on the minimum similarity between the region R and each of the neighboring regions $R_n$. Additionally or alternatively, the feature extractor f(•) determines features of the indicated region or sub-region. For example, $f(R_n)$ determines features of the sub-region $R_n$. In some cases, the outer region similarity identifies swatches in the center of repetitive patterns in the input image 103.

In some embodiments, the feature extractor f(•) determines one or more of color histogram features, texture features, or deep neural network features. The feature extractor can store one or more of the extracted features in a vector $f_i$ to compute a similarity score, such as an inner or outer region similarity. In additional or alternative embodiments, the similarity function sim(•) can use any kernel function that is suitable to the type of features extracted by the feature extractor f(•). For example, if histogram features are extracted, the similarity function sim(•) could include a minimization kernel function (e.g., min(•) function). In some embodiments, a kernel may be any executable program code core to the operation of a computing system. For example, the minimization kernel function can compare two values, and return the lower data value. In some cases, the minimization function can process any numeric data type. Other suitable similarity functions are based on (without limitation) a mean color of the features, a Euclidean similarity of the features, a normalized dot product, or any other suitable function.

At block 308, the process 300 involves determining the likelihood score based on the inner and outer region similarity. For instance, the likelihood scoring engine 105 determines the likelihood score based on results from one or more of Equation 1 or Equation 2. In some embodiments, the inner region similarity and outer region similarity can be combined for multiple types of features. For example, a set of feature types could be represented by $\{f_i: i=1, 2, \ldots, t\}$. The likelihood score can be formulated, for example, by the Equation 3.

$$L(R) = \Pi_{i=1}^t S_{inner}^{fi}(R) \Pi_{i=1}^t S_{outer}^{fi}(R) \qquad \text{Eq. 3}$$

In Equation 3, $S_{inner}^{fi}$ and $S_{outer}^{fi}$ are, respectively, the inner and outer similarity scores for the region R. The term L(R) indicates an example of a likelihood score for region R, according to an embodiment of the present invention. The mathematical operator Π indicates a product of the inner similarity terms $S_{inner}^{fi}(R)$ or outer similarity terms $S_{outer}^{fi}(R)$ over a range from i equaling 1 to t, where t indicates the total number of feature types as illustrated by the set of feature types $f_i$ represented above.

In some embodiments, the likelihood score can be formulated as the product of inner region similarities for a set of feature types, combined with the product of outer region similarities for a set of feature types. Other techniques for determining a likelihood score are possible, including scores based on other combinations of feature types, inner region similarity, or outer region similarity.

Figure 4:
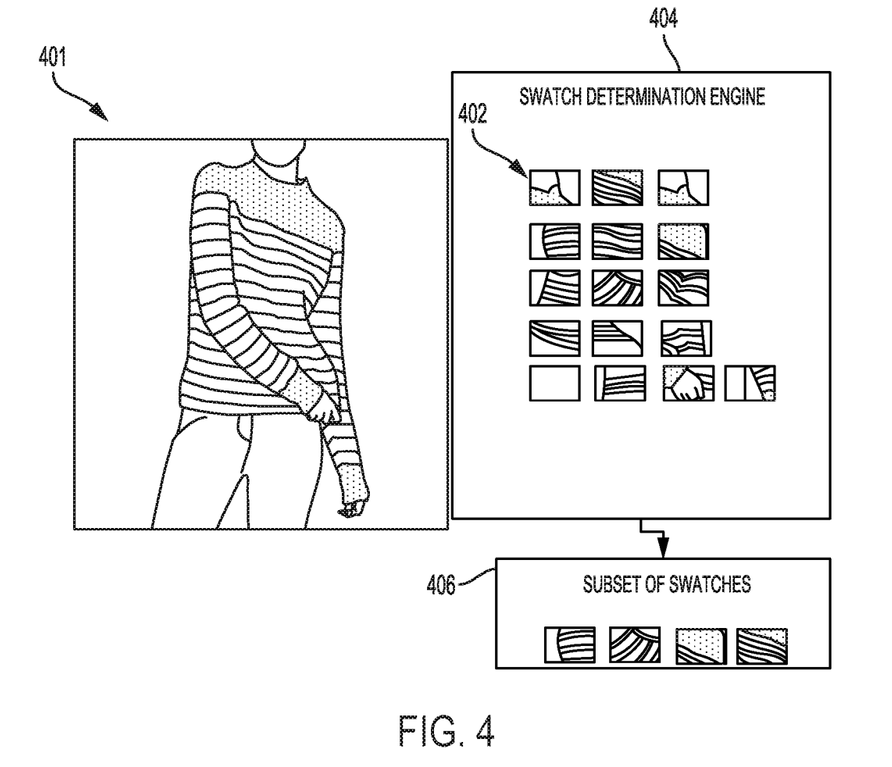
FIG. 4 is a block diagram depicting an example of an input image used for determining a diverse subset of likely representative swatches, according to certain embodiments of the present disclosure, according to certain embodiments of the present disclosure.

FIG. 4 depicts a diagram of an example input image 401, from which a subset of swatches 406 is generated. In FIG. 4, the input image 401 is provided to a swatch determination engine 404. Based on the image 401, the swatch determination engine 404 selects a set of initial swatches 401, such as swatches based on a salient object detected in the input image 401. In some cases, the swatch determination engine 404 extracts each swatch included in the set of initial swatches 402. Additionally or alternatively, a likelihood score is assigned to at least one of the swatches in the set of initial swatches 402. Based at least in part on the likelihood score, a subset of swatches 406 is determined. In some cases, a graphics manipulation application (such as described in regards to FIG. 1), determines the subset of swatches 406. Additionally or alternatively, the subset of swatches 406 includes swatches indicating diverse and representative areas of the input image 401.

Figure 5:
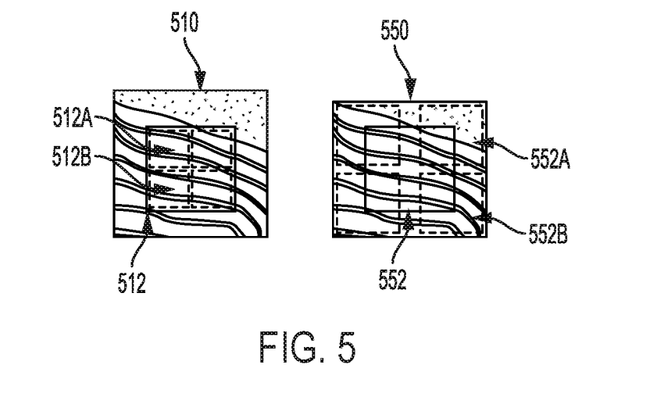
FIG. 5 is a diagram depicting an example of a visual representation of inner and outer similarity computations, according to certain embodiments of the present disclosure.

FIG. 5 depicts a diagram of an example technique for calculating a likelihood score based on similarities between regions of an image. In some cases, a likelihood engine, such as the likelihood engine 105, calculates the likelihood score based on one or more of Equations 1, 2, or 3.

In some cases, the likelihood score is calculated based at least on an inner region similarity. For example, a region 510 of an input image includes a swatch 512. Additionally or alternatively, the swatch 512 includes one or more sub-regions, such as the sub-regions 512a and 512b. An inner region similarity is determined for the swatch 512 based on, for example, a comparison of the sub-regions 512a and 512b. The inner region similarity is computed, for example, based on Equation 1. FIG. 5 depicts the swatch 512 as including a subset of pixels included in the region 510, but other relationships are possible, such as the swatch 512 including a set of pixels congruent with the region 510.

Additionally or alternatively, the likelihood score is calculated based at least on an outer region similarity. For example, a region 550 of an input image includes a swatch 552. Additionally or alternatively, the region 550 includes one or more regions that neighbor the swatch 552, such as the neighboring regions 552a and 552b. An outer region similarity is determined for the swatch 552 based on, for example, a comparison of the swatch 552 to the neighboring regions 552a and 552b. The outer region similarity is computed, for example, based on Equation 2. FIG. 5 depicts the neighboring regions 552a and 552b as overlapping the swatch 552, but other relationships are possible, such as neighboring regions that are adjacent to the swatch 522 or adjacent to the region 550. In some cases, the likelihood score is calculated based on both an inner region similarity and an outer regions similarity.

Likelihood Score Based on Deep Learning Neural Network

In some embodiments, a likelihood score can be determined by a deep learning process. For example, a deep learning neural network is trained by collecting randomly generated swatch candidates from a set of training images. These random swatch candidates may be given training labels of "representative" or "non-representative." In some cases, the neural network is trained to predict the labels using any suitable method of neural network training. For example, the neural network could be trained to predict labels using the softmax binary classification loss. Based on a deep learning approach, the likelihood score is, for example, a probability of a swatch being a representative swatch. However, other techniques for assigning the likelihood using a deep learning approach are possible. For example, deep learning neural network provides a vector output indicating a likelihood score. Additionally or alternatively, a convolutional neural network provides an output indicating a map of likelihood scores (e.g., a heat map).

Figure 6:
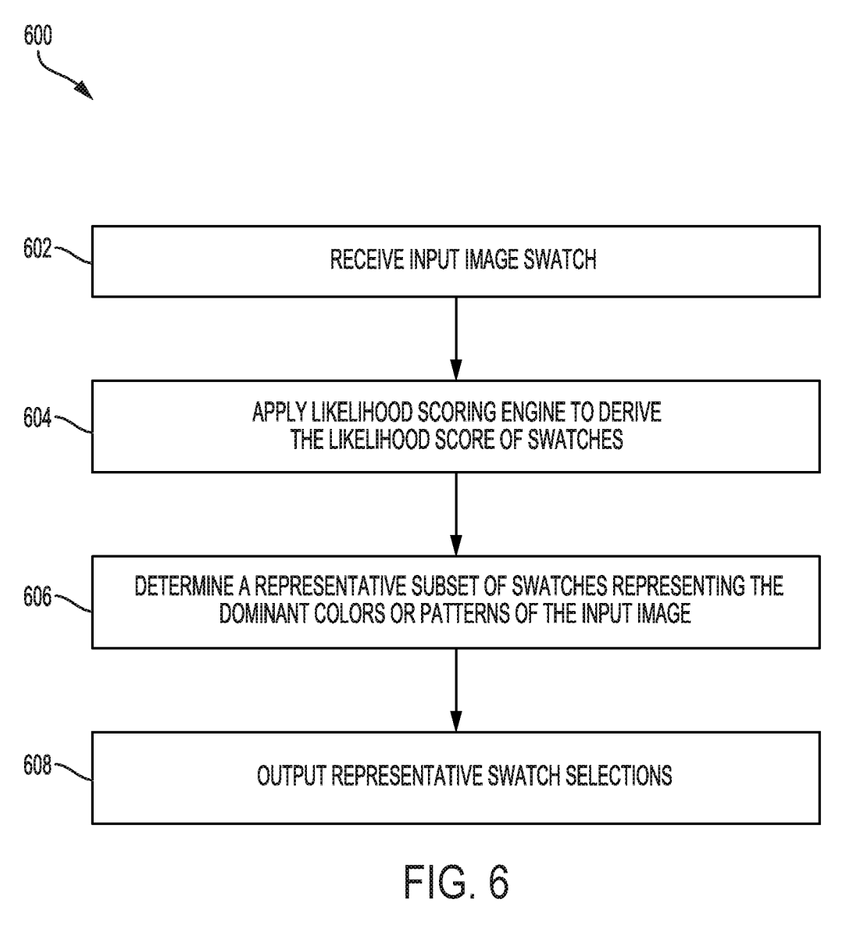
FIG. 6 is a block diagram depicting an example of a process used by the system in FIG. 1 for a representative subset of swatches, according to certain embodiments of the present disclosure.

FIG. 6 depicts an example of a process for determining a representative subset of swatches based on a trained deep learning neural network. One or more computing devices (e.g., devices included in the computing environment 100) implement operations depicted in FIG. 6 by executing suitable program code. For illustrative purposes, the process 600 is described with reference to certain examples depicted in the figures. Other implementations, however, are possible.

At block 602, the process 600 involves receiving an extracted swatch, such as from an input image. In some cases, the swatch is received by the likelihood scoring engine 105 from the swatch determination engine 104. The extracted swatch may be received by any method for transferring portions of images.

At block 604, the process 600 involves applying a likelihood engine to derive the likelihood score of swatches. For example, the likelihood scoring engine 105 assigns a likelihood core using a deep learning approach, or other method of a trained neural network. In some embodiments, the likelihood score can be assigned based on the trained neural network determining a probability that any given swatch is a representative swatch of the received input image. In additional or alternative embodiments, the neural network can be trained using training input images and swatches labeled "representative" or "not representative." Other implementations, however, are possible.

At block 606, the graphics manipulation application determines a representative subset of swatches representing the dominant colors or patterns of an input image. For example, such as graphics manipulation application 101 may determine a representative subset of swatches 106 by a comparison of likelihood scores assigned by likelihood scoring engine 105. An additional embodiment could involve comparing each swatch to other swatches and determining that a similarity metric is below a threshold similarity value.

At block 608, a subset of swatches is output to an image display system. The image display device may be a third party content server, or another type of content storage device. For example, the subset of swatches 106 can be sent to image display device 107. Additionally, image display device 107 can send the subset of swatches 106 to a user device 108 upon receipt of a request from a user device 108. In additional or alternative embodiments, the image display system 107 may use any means of transferring image content to user device 108.

Dominance Value

In some embodiments, the determination of a representative subset of swatches 106 involves computing a dominance value. For example, the dominance value for a particular swatch indicates the prevalence of a pattern depicted in the swatch, such as by indicating how frequently the pattern appears in other swatches. In some cases, a particular swatch that has a high dominance value (e.g., includes a pattern that appears in many of the other swatches) has a low diversity compared to the other swatches.

In some cases, a dominance value is determined by a graphics manipulation application. For example, for any n number of candidate swatches, the graphics manipulation application 101 constructs a n×n matrix $[x_{ij}]_{n \times n}$, where $x_{ij}$ represents the product of a likelihood score and a similarity score for each of the respective candidate swatches. For example, the matrix $[x_{ij}]_{n \times n}$ includes i rows, where each row includes the likelihood score (or similarity score) of the region $R_i$ multiplied by the respective similarity scores (or likelihood scores) of each of the regions $R_j$ (such as additional regions $R_j$ in the input image). Additionally or alternatively, the matrix $[x_{ij}]_{n \times n}$ includes j columns, where each column includes the likelihood score (or similarity score) of the region $R_j$ multiplied by the respective similarity scores (or likelihood scores) of each of the regions $R_i$ (such as additional regions $R_i$ in the input image). In some embodiments, $x_{ij}$ can be determined, for example, by the Equation 4.

$$x_{ij} = L(R_j) \cdot \theta(R_i, R_j) \qquad \text{Eq. 4}$$

In Equation 4, L(R) represents a likelihood score for a region $R_j$, such as a likelihood score determined based on Equation 3, or a likelihood score based on an output from a deep learning neural network, such as described with regards to FIG. 6. The θ term represents a similarity function for determining a similarity between two regions $R_i$ and $R_j$, such as a similarity function with a value range [0, 1] (e.g., 0 indicating relatively little or no similarity, 1 indicating relatively high or complete similarity). In the context of Equation 4, $R_i$ and $R_j$ are each regions of the input image that include a respective candidate swatch. For general understanding and not by way of limitation, the θ similarity function may or may not include comparable mathematical functions to the similarity function sim(•) described in regards to Equations 1 and 2.

The dominance value for region $R_i$ can be computed as the summation across j terms of the product of a likelihood score and a similarity score for each region $R_i$, formulated, for example, by Equation 5.

$$V_i = \Sigma_j x_{ij} \quad \text{Eq. 5}$$

In Equation 5, the term $V_i$ indicates the dominance value for the region $R_i$ (e.g., in the ith row of the matrix $[x_{ij}]_{n \times n}$), based on the summation of the $x_{ij}$ terms for each region $R_j$ (e.g., in each of the j columns across the ith row of the matrix $[x_{ij}]_{n \times n}$). Individual swatches with many similar swatches of high likelihood scores will generally receive high dominance values.

Selection Score

The subset of swatches 106 may be generated based on a selection of diverse and representative swatches. For example, the selection is based on a selection score for each swatch. In some cases, the selection score is based on a combination of the similarity score and dominance value for a region including the swatch, such as $L(R_i)$ and $V_i$ for the region $R_i$. In some embodiments, the combination may be represented, for example, by Equation 6.

$$\hat{i} = \arg\max_{i} L(R_i)^{\propto} V_i \quad \text{Eq. 6}$$

In Equation 6, the terms $L(R)$ and $V_i$ are the likelihood score and dominance value, respectively, for the region $R_i$. The term $\hat{i}$ is a selection score for the region $R_i$. The term $\propto$ is a weighting parameter. In some cases, the parameter $\propto$ indicates a weight applied to the likelihood score calculated for the region $R_i$. For example, if $\propto$ is relatively large, the term $\hat{i}$ will have a relatively high dependence on $L(R)$ and a relatively low dependence on $V_i$. Additionally or alternatively, if $\propto$ is relatively small, the term $\hat{i}$ will have a relatively low dependence on $L(R)$ and a relatively high dependence on $V_i$. The value of the parameter $\propto$ is selected, for example, based on a user input, or an automated calculation, or via another suitable technique. In some cases, the term $\hat{i}$ represents the maximum combination of the likelihood score and dominance value for given row i in the matrix $[x_{ij}]_{n \times n}$.

Regarding Equation 6, the selection score $\hat{i}$ represents a maximum product of likelihood score and dominance value for a particular candidate swatch for the region $R_i$. In some cases, Equation 6 is repeated for additional candidate swatches until a threshold number of candidate swatches are selected, such as a number of swatches included in the subset of swatches 106. The threshold number is based on a numeric quantity of swatches (e.g., repeat Equation 6 on various candidate swatches until five candidate swatches are selected). Additionally or alternatively, the threshold number is based on a threshold score of candidate swatches (e.g., candidate patches that have a selection score $\hat{i}$ above or below a threshold value). In some cases, the matrix $[x_{ij}]_{n \times n}$ is updated based on a result from Equation 6. For example, the matrix $[x_{ij}]_{n \times n}$ is modified to remove the region $R_i$ associated with a selected candidate swatch. Additionally or alternatively, the matrix $[x_{ij}]_{n \times n}$ is modified to remove a particular row that is associated with the region $R_i$ having the maximum selection score 1. In some embodiments, the matrix $[x_{ij}]_{n \times n}$ is updated, for example, based on Equation 7.

$$x_{ij} = \max\{x_{ij} - x_{ij}, 0\} \quad \text{Eq. 7}$$

In the Equation 7, each $x_{ij}$ term in the matrix $[x_{ij}]_{n \times n}$ is updated based on the maximum value of zero, or the difference between the present $x_{ij}$ term (e.g., prior to updating) and the $x_{ij}$ term. For example, if the term î represents the maximum combination of the likelihood score and dominance value for given row i in the matrix $[x_{ij}]_{n \times n}$, subtracting the $x_{ij}$ term from each of the remaining terms $x_{ij}$ in a given column j may provide a negative result for each term $x_{ij}$ that includes a combined likelihood score and value of a similarity function (e.g., such as described in regards to Equation 4) with a value less than the term $x_{ij}$. In some embodiments, the value of each $x_{ij}$ term in the column j is updated based on a maximum of either zero or the difference between the present $x_{ij}$ term and the $x_{ij}$ term, such as based on Equation 7.

In some embodiments, the set of selected swatches includes representative swatches, diverse swatches, or both. For example, if the parameter $\propto$ is relatively large, each candidate swatch in the group may be selected based primarily on a representativeness of the particular swatch (e.g., swatches that are highly representative of the overall pattern of the input image). If the parameter $\propto$ is relatively small, each candidate swatch in the group may be selected based primarily on a diversity of the particular swatch (e.g., swatches that depict highly diverse patterns of the overall image).

Figure 7:
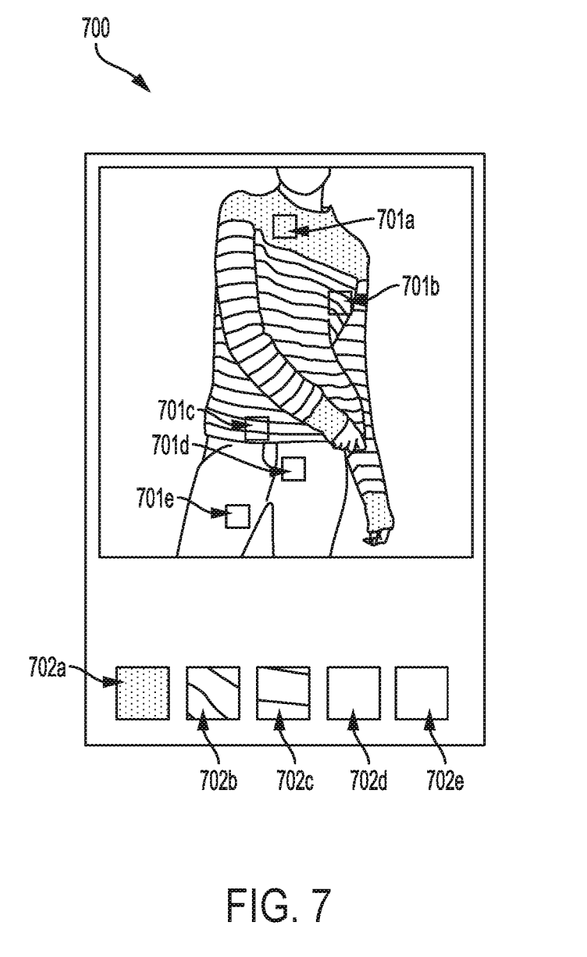
FIG. 7 is a diagram depicting an example of an output image as viewable on a user device with the subset of swatches, according to certain embodiments of the present disclosure.

FIG. 7 depicts an example of an output image 700, based on a combination of an input image and a subset of swatches. In some cases, the user device 108 receives the output image 700, such as from the image display system 107. Additionally or alternatively, the output image 700 is displayed, such as on a display device associated with the user device 108. In the output image 700, one or more areas, such as the areas 701a-701e, are extracted as swatches, such as by the swatch determination engine 104. Additionally or alternatively, a subset of swatches including the swatches 702a-702e is determined based on the areas 701a-701e. For example, one or more of a likelihood score or a dominance value are determined for each extracted swatch. Based on the likelihood score, each of the swatches 702a-702e is determined to be a representative swatch. Based on the dominance value, each of the swatches 702a-702e is determined to be a diverse swatch. The subset of swatches 106 is illustrated on a user device 108, for example, as swatches 702a-702e.

Figure 8:
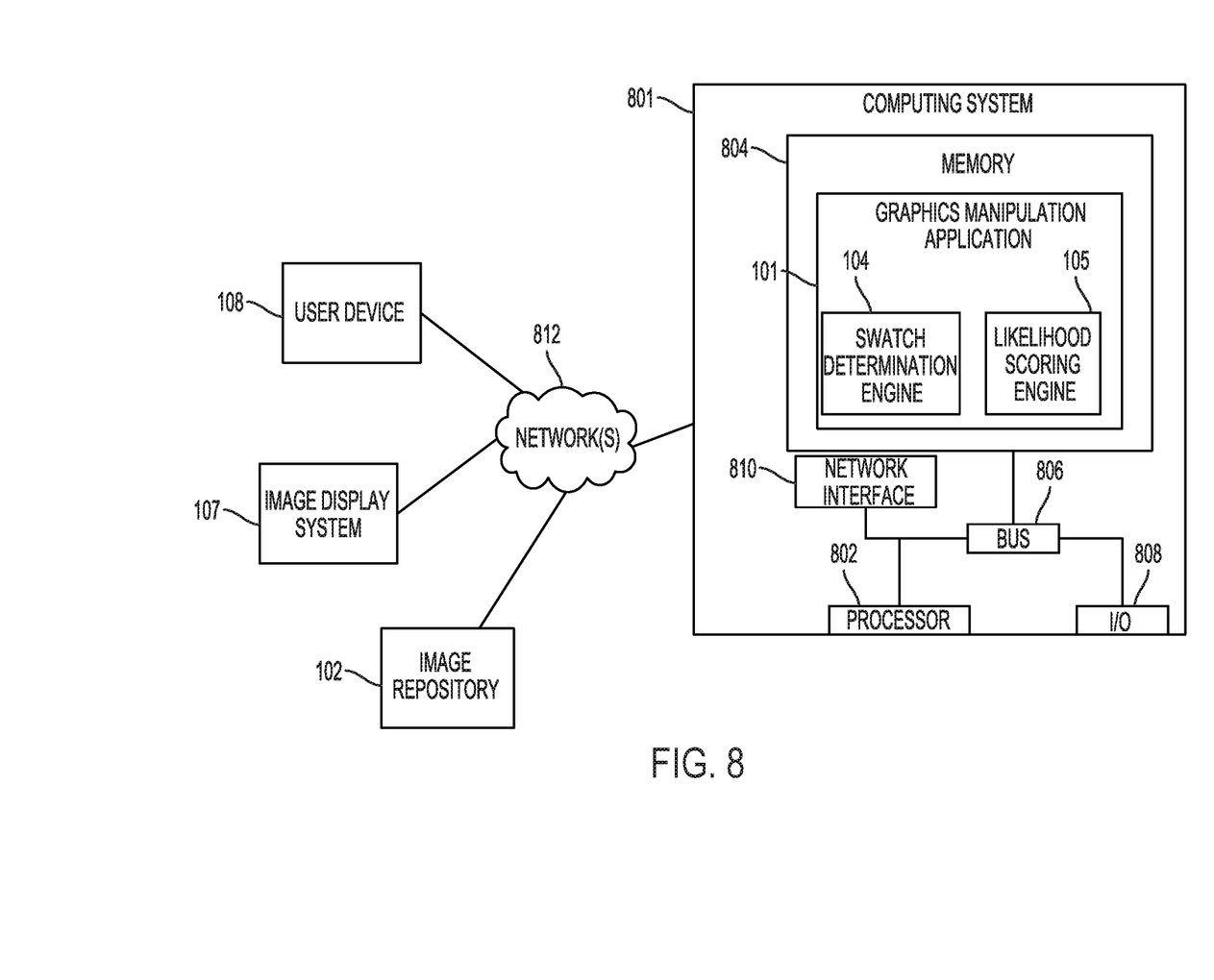
FIG. 8 is a diagram depicting an example of a computing system for determining a diverse representative subset of swatches, according to certain embodiments of the present disclosure.

Any suitable computing system or group of computing systems can be used for performing the operations described herein. For example, FIG. 8 is a block diagram depicting a computing system for determining a diverse representation of swatches for a received input image, according to certain embodiments.

The depicted example of a computing system 801 includes one or more processors 802 communicatively coupled to one or more memory devices 804. The processor 802 executes computer-executable program code or accesses information stored in the memory device 804. Examples of processor 802 include a microprocessor, an application-specific integrated circuit ("ASIC"), a field-programmable gate array ("FPGA"), or other suitable processing device. The processor 802 can include any number of processing devices, including one.

The memory device 804 includes any suitable non-transitory computer-readable medium for storing the input image 103, subset of swatches 106, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 801 may also include a number of external or internal devices such as input or output devices. For example, the computing system 801 is shown with an input/output ("I/O") interface 808 that can receive input from input devices or provide output to output devices. A bus 806 can also be included in the computing system 801. The bus 806 can communicatively couple one or more components of the computing system 801.

The computing system 801 executes program code that configures the processor 802 to perform one or more of the operations described above with respect to FIG. 1-7. The program code includes operations related to, for example, the swatch determination engine 104, the likelihood scoring engine 105, or other suitable applications or memory structures that perform one or more operations described herein. The program code may be resident in the memory device 904 or any suitable computer-readable medium and may be executed by the processor 902 or any other suitable processor. In some embodiments, the program code described above, the received input image 103 and the subset of swatches 106 are stored in the memory device 904, as depicted in FIG. 8. In additional or alternative embodiments, one or more of the received input image 103 and the subset of swatches 106, and the program code described above are stored in one or more memory devices accessible via a data network, such as a memory device accessible via a cloud service.

The computing system 801 depicted in FIG. 8 also includes at least one network interface 810. The network interface 810 includes any device or group of devices suitable for establishing a wired or wireless data connection to one or more data networks 812. Non-limiting examples of the network interface 810 include an Ethernet network adapter, a modem, and/or the like. Although FIG. 8 depicts the image repository 102 and the image display device as connected to computing system 801 via the networks 812, other embodiments are possible, including the image repository 102 or the image display system 107 being stored in the memory 804 of computing system 801.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method of determining a set of representative swatches of an image, wherein the method includes one or more processing devices performing operations comprising:
determining a salient object in an image, where the salient object includes pixels that depict a pattern or color visible on the salient object;
extracting multiple swatches from the image, wherein each of the multiple swatches includes pixels that depict the pattern or color visible on the salient object;
computing selection scores for the multiple swatches, respectively, wherein, for each particular swatch of the multiple swatches, a respective selection score is computed by:
determining, for the particular swatch, (i) a respective likelihood score indicating a representativeness of the pattern or color depicted by the pixels included in the particular swatch, wherein the respective likelihood score is calculated based on a combination of an inner region similarity score of the particular swatch and an outer region similarity score of the particular swatch, and (ii) a respective dominance value indicating a dominance of the pattern or color depicted by the pixels included in the particular swatch, and determining, for the particular swatch, a respective selection score based on a combination of the respective likelihood score and the respective dominance value; and generating, based on the selection scores of the multiple swatches, a subset of the multiple swatches extracted from the image.

2. The method of claim 1, wherein the inner region similarity score of the particular swatch is determined by additional operations comprising:

extracting features from a first region associated with the particular swatch, wherein the first region includes pixels that are also included in the particular swatch;

determining a first feature vector for the first region, the first feature vector based on the extracted features; and defining the inner region similarity score based on the first feature vector for the first region.

3. The method of claim 1, wherein the outer region similarity score of the particular swatch further is determined by additional operations comprising:

extracting additional features from a second region associated with the particular swatch, wherein the second region includes pixels that are not included in the particular swatch;

determining a second feature vector for the second region, the second feature vector based on the extracted additional features; and defining the outer region similarity score based on the second feature vector for the second region.

4. The method of claim 1, wherein the respective likelihood score of the particular swatch is based on an output from a deep learning neural network.

5. The method of claim 1, wherein determining the respective dominance value of the particular swatch comprises:

defining a matrix, the matrix having a dimension based on a quantity of the multiple swatches;

determining multiple values in the matrix that are related to the particular swatch, wherein each respective value of the multiple values is based on (i) a respective similarity metric between the particular swatch and a respective additional swatch of the multiple swatches, and (ii) the respective likelihood score of the respective additional swatch; and determining an aggregation of the multiple values related to the particular swatch.

6. The method of claim 1, wherein determining the respective selection score of the particular swatch comprises:

determining, for each of the multiple swatches, a respective product based on the respective likelihood score of each of the multiple swatches and the respective dominance value of each of the multiple swatches; and determining a maximum product of the respective products.

7. The method of claim 1, wherein determining the salient object in the image comprises generating a binary mask for a localized foreground region, wherein a mask pixel included in the binary mask indicates that a corresponding image pixel in the image is included in the salient object.

8. A non-transitory computer-readable medium embodying program code for determining a set of representative swatches of an image, the program code comprising instructions which, when executed by a processor, cause the processor to perform operations comprising:

determining a salient object in an image, where the salient object includes pixels that depict a pattern or color visible on the salient object;

extracting multiple swatches from the image, wherein each of the multiple swatches includes pixels that depict the pattern or color visible on the salient object;

computing selection scores for the multiple swatches, respectively, wherein, for each particular swatch of the multiple swatches, a respective selection score is computed by:

determining, for the particular swatch, (i) a respective likelihood score indicating a representativeness of the pattern or color depicted by the pixels included in the particular swatch, wherein the respective likelihood score is calculated based on a combination of an inner region similarity score of the particular swatch and an outer region similarity score of the particular swatch, and (ii) a respective dominance value indicating a dominance of the pattern or color depicted by the pixels included in the particular swatch, and determining, for the particular swatch, a respective selection score based on a combination of the respective likelihood score and the respective dominance value; and generating, based on the selection scores of the multiple swatches, a subset of the multiple swatches extracted from the image.

9. The non-transitory computer-readable medium of claim 8, wherein the inner region similarity score of the particular swatch is determined by:

extracting features from a first region associated with the particular swatch, wherein the first region includes pixels that are also included in the particular swatch;

determining a first feature vector for the first region, the first feature vector based on the extracted features; and defining the inner region similarity score based on the first feature vector for the first region.

10. The non-transitory computer-readable medium of claim 8, wherein the outer region similarity score of the particular swatch is determined by:

extracting additional features from a second region associated with the particular swatch, wherein the second region includes pixels that are not included in the particular swatch;

determining a second feature vector for the second region, the second feature vector based on the extracted additional features; and defining the outer region similarity score based on the second feature vector for the second region.

11. The non-transitory computer-readable medium of claim 8, wherein the respective likelihood score of the particular swatch is based on an output from a deep learning neural network.

12. The non-transitory computer-readable medium of claim 8, wherein determining the respective dominance value of the particular swatch comprises:

defining a matrix, the matrix having a dimension based on a quantity of the multiple swatches;

determining multiple values in the matrix that are related to the particular swatch, wherein each respective value of the multiple values is based on (i) a respective similarity metric between the particular swatch and a respective additional swatch of the multiple swatches, and (ii) the respective likelihood score of the respective additional swatch; and determining an aggregation of the multiple values related to the particular swatch.

13. The non-transitory computer-readable medium of claim 8, wherein determining the respective selection score of the particular swatch comprises:
   determining, for each of the multiple swatches, a respective product based on the respective likelihood score of each of the multiple swatches and the respective dominance value of each of the multiple swatches; and
   determining a maximum product of the respective products.

14. A system for determining a set of representative swatches of an image, the system comprising:
   a means for determining a salient object in an image, where the salient object includes pixels that depict a pattern or color visible on the salient object;
   a means for extracting multiple swatches from the image, wherein each of the multiple swatches includes pixels that depict the pattern or color visible on the salient object;
   a means for computing selection scores for the multiple swatches, respectively, wherein, for each particular swatch of the multiple swatches, a respective selection score is computed by:
      determining, for the particular swatch, (i) a respective likelihood score indicating a representativeness of the pattern or color depicted by the pixels included in the particular swatch, wherein the respective likelihood score is calculated based on a combination of an inner region similarity score of the particular swatch and an outer region similarity score of the particular swatch, and (ii) a respective dominance value indicating a dominance of the pattern or color depicted by the pixels included in the particular swatch, and
      determining, for the particular swatch, a respective selection score based on a combination of the respective likelihood score and the respective dominance value; and
   a means for generating, based on the selection scores of the multiple swatches, a subset of the multiple swatches extracted from the image.

15. The system of claim 14, wherein the inner region similarity score of the particular swatch is determined by:
   a means for extracting features from a first region associated with the particular swatch, wherein the first region includes pixels that are also included in the particular swatch;
   a means for determining a first feature vector for the first region, the first feature vector based on the extracted features; and
   a means for defining the inner region similarity score based on the first feature vector for the first region.

16. The system of claim 14, wherein the outer region similarity score of the particular swatch is determined by:
   a means for extracting additional features from a second region associated with the particular swatch, wherein the second region includes pixels that are not included in the particular swatch;
   a means for determining a second feature vector for the second region, the second feature vector based on the extracted additional features; and
   a means for defining the outer region similarity score based on the second feature vector for the second region.

17. The system of claim 14, wherein the respective likelihood score of the particular swatch is based on an output from a deep learning neural network.

18. The system of claim 14, wherein determining the dominance value of the particular swatch comprises:
   a means for defining a matrix, the matrix having a dimension based on a quantity of the multiple swatches;
   a means for determining multiple values in the matrix that are related to the particular swatch, wherein each respective value of the multiple values is based on (i) a respective similarity metric between the particular swatch and a respective additional swatch of the multiple swatches, and (ii) the respective likelihood score of the respective additional swatch; and
   a means for determining an aggregation of the multiple values related to the particular swatch.

19. The system of claim 14, wherein determining the selection score of the particular swatch comprises:
   a means for determining, for each of the multiple swatches, a respective product based on the respective likelihood score of each of the multiple swatches and the respective dominance value of each of the multiple swatches; and
   a means for determining a maximum product of the respective products.

20. The system of claim 14, wherein determining the salient object in the image comprises generating a binary mask for a localized foreground region, wherein a mask pixel included in the binary mask indicates that a corresponding image pixel in the image is included in the salient object.

* * * * *